United States Patent [19]
Fawcett et al.

[11] 3,953,915
[45] May 4, 1976

[54] METHOD AND APPARATUS FOR REMOVING TREAD MATERIAL FROM RADIAL BELTED TIRES

[75] Inventors: William E. Fawcett, Latrobe; Robert S. Gulibon, Mount Pleasant, both of Pa.

[73] Assignee: Kennametal Inc., Latrobe, Pa.

[22] Filed: Feb. 4, 1975

[21] Appl. No.: 546,989

[52] U.S. Cl. ............................................. 29/105 R
[51] Int. Cl.² ........................................ B26D 1/12
[58] Field of Search ........... 29/105 R, 105 A, 103 R

[56] References Cited
UNITED STATES PATENTS

| 1,125,537 | 1/1915 | Hoover | 29/105 A |
| 1,460,029 | 6/1923 | Mattson | 29/105 A |
| 2,265,643 | 12/1941 | Heath | 29/105 R |
| 2,664,617 | 1/1954 | Kralowetz | 29/105 R |
| 3,604,084 | 9/1971 | Krieger et al. | 29/105 R X |
| 3,729,808 | 5/1973 | Wolf et al. | 29/105 R |

Primary Examiner—Harrison L. Hinson
Attorney, Agent, or Firm—Melvin A. Crosby

[57] ABSTRACT

A method and apparatus for removing tread material from a pneumatic tire preparatory to recapping comprising a machine with a reversibly rotatable cutting disc with hardened cutting inserts located on the disc to take discrete elongate rubber chips from the pneumatic tire, thereby eliminating the usual dirt and smoke attributed to tire de-treaders.

7 Claims, 9 Drawing Figures

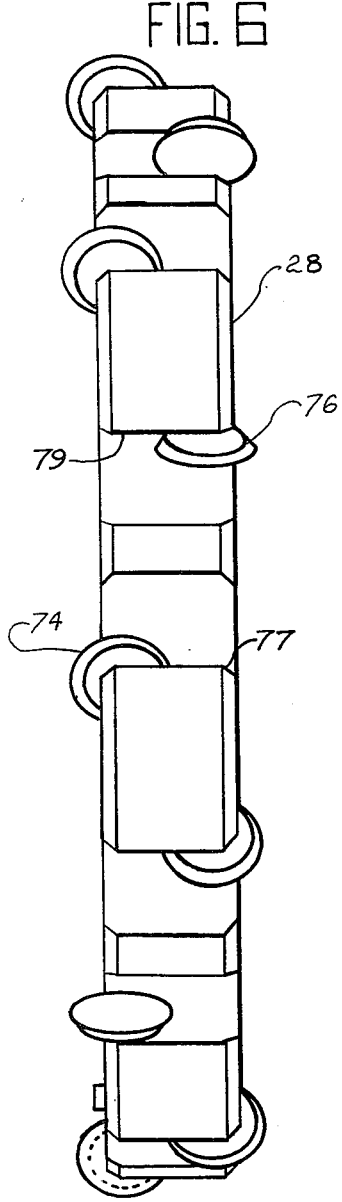
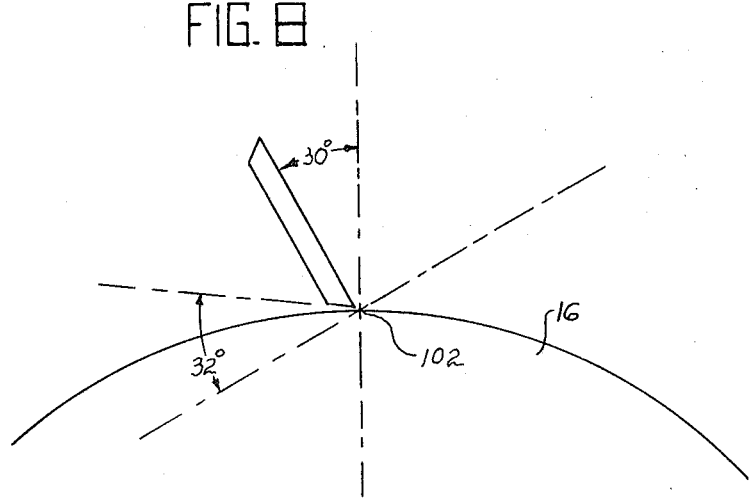
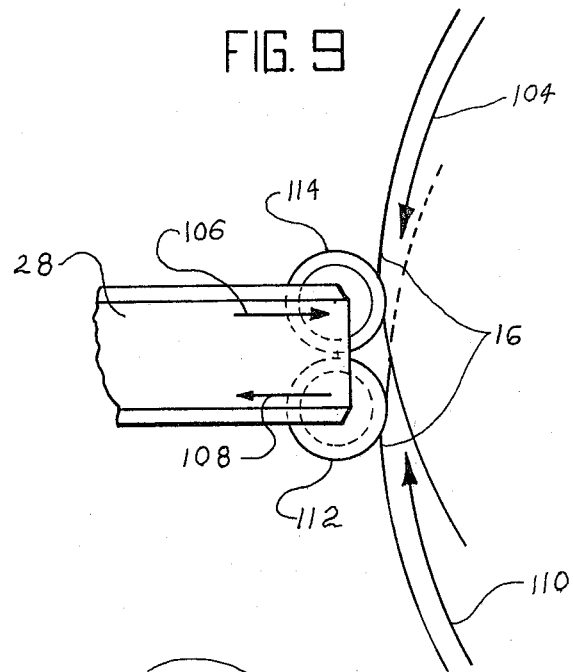
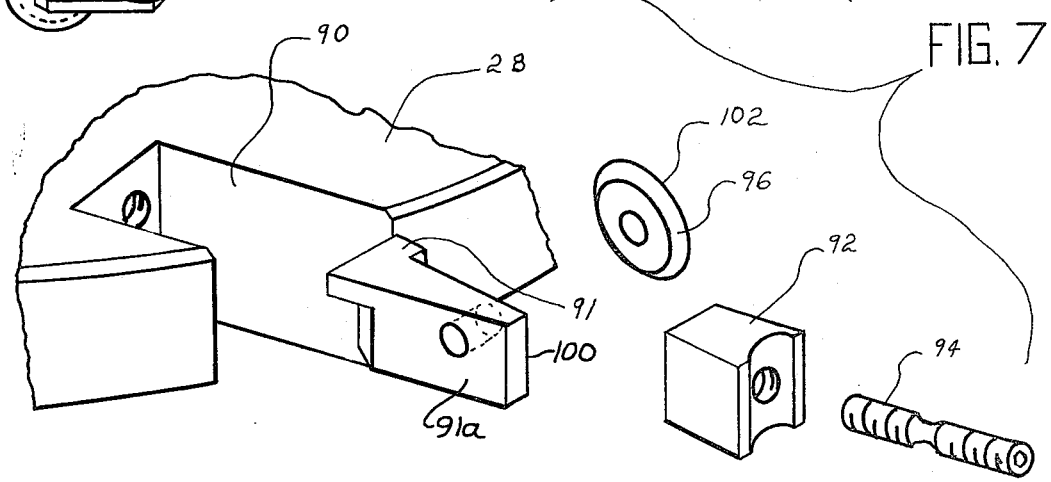

METHOD AND APPARATUS FOR REMOVING TREAD MATERIAL FROM RADIAL BELTED TIRES

RELATED APPLICATION

U.S. Ser. No. 471,050, filed May 17, 1974, entitled "METHOD AND APPARATUS FOR REMOVING TREAD MATERIAL FROM VEHICLE TIRES," which is a continuation-in-part of Ser. No. 379,372, filed July 16, 1973, now abandoned.

The present invention relates to the removing of tread material from a radially belted vehicle tire preparatory to the retreading of the vehicle tire and is particularly concerned with a method of removing the tread material and to a cutting device which effects the removal of the tread material from the tire.

The removing of tread material from pneumatic vehicle tires is a well known procedure and is generally accomplished by abrading the periphery of the tire with an abrading element which may be in the form of a barbed rasp, or a moving member having coarse abrasive thereon. It has also been attempted to remove the tread material by cutting with a sharp knife.

The defect with the first mentioned system is that considerable heat is generated which results in the development of dust and smoke and vapors while, furthermore, the tread material is removed in such a manner that a great deal of it is in extremely fine form, thus, creating a dusty condition which can be hazardous to the health and which can form a fire hazard and which, furthermore, requires the installation of rather expensive dust collecting equipment.

In the second mentioned method in which a sharp knife is employed for removing the tread material, a great deal of force is required to turn the tire against the cutting blade and foreign material imbedded in the tread material can severely damage such knives. Furthermore, this procedure for removing the tread material from a vehicle tire is not as rapid as the removal of the tread material by an abrasive device.

A further method of removing tread material is revealed in a related application, Ser. No. 471,050, filed May 17, 1974, which is a continuation-in-part of Ser. No. 379,372, filed July 16, 1973, now abandoned, in which a rotatable cutting device is used to cut chips from the tire periphery.

In the above-mentioned application, the cutter rotates in one direction only, the tire in one direction only and the traverse relative motion between the cutting device and the tire is one complete cammed motion from the beginning cut on the tire until the tire is finished. It has been found that the cutting device as mentioned by the related application has drawbacks when used in removing tread material from radial belted vehicle tires.

With radially belted vehicle tires, the use of any cutting device which starts from one axially outer side wall of a radial tire and proceeds to the opposite axial side wall, there is a risk of cutting into the radial belt material imbedded in the tire itself. The reason for this is the dynamic forces acting on the tire during the cutting operation cause deformation of the tire body.

When the cutters are removing chips at the axial center of the tire crown, there is deformation radially inward on the radial belts and surrounding tire material. This deformation is uniform and is gradually relieved as the cutters traverse from the crown to an axial outer wall and finally off the tire periphery.

A cutter brought in to engage the periphery of the tire at its axial outer wall first does not provide a uniform radially inward deformation of the belted material and will cut deeply into the tire periphery, cutting the radially belted material and rendering the tire economically useless.

Having the foregoing in mind, a primary objective of the present invention is the provision of a method and apparatus for removing tread material from a vehicle tire preparatory to retreading the tire which is rapid and efficient.

Another object is the provision of a method and apparatus of the nature referred to in which there is substantially no dust or smoke developed during the removing of the material from the tire tread.

Still another object is the provision of a method and apparatus for removing tread material from a vehicle tire preparatory to recapping the tire which eliminates the need for expensive dust separators and which also reduces health and fire hazards that usually go with such an operation.

Still another object is the provision of a cutting device for cutting tread rubber from a vehicle tire preparatory to recapping the tire in which replaceable indexable cutting elements are employed.

Still another object of the present invention is a method and apparatus for cutting tread material from a radial belted vehicle tire so as to reduce the risk of cutting into the imbedded belting material.

BRIEF SUMMARY OF THE INVENTION

A method and apparatus for removing tread material from vehicle radial belted tires preparatory to retreading the tire in which a rotary cutter reversibly rotating on an axis generally vertical with the axis of rotation of the tire has sharp cutting elements therein which cut chips when the cutter and the tire are rotating in specified directions.

With the tire and the cutter rotating, the cutter is moved transversely across the outer periphery portion of the tire starting from near the axial center of the tire crown and traversing a cam followed path axially outward from the crown to a tire wall; the cutter then being repositionable horizontally at the axial center of the crown, the specified directions of the cutter and tire being both reversed, the cutter being repositioned near the radial centerline to engage the axial center of the tire crown and traversing a cam followed path axially outward from the crown to the opposite tire side wall.

The cutter body having slots in its outer periphery wherein sharp cutting inserts are disposed in positive rake angle portions so as to allow the cutter to take discretely sized elongate chips when rotating in either direction.

The exact nature of the present invention will become more apparent upon reference to the following detailed specification taken in connection with the accompanying drawings in which:

FIG. 6 shows a perspective side view of the cutting device with inserts.

FIG. 7 is an exploded perspective view showing a cutting insert employed with the cutting device of FIGS. 5 and 6 showing the supporting nest therefor and clamping mechanism.

FIG. 8 is a view of the insert of FIG. 7 showing the angular relationship of the insert to the workpiece.

FIG. 9 is a side view showing the cutting devices vertical displacement while engaging the tire body.

DETAILED DESCRIPTION OF THE INVENTION

Figure 1:
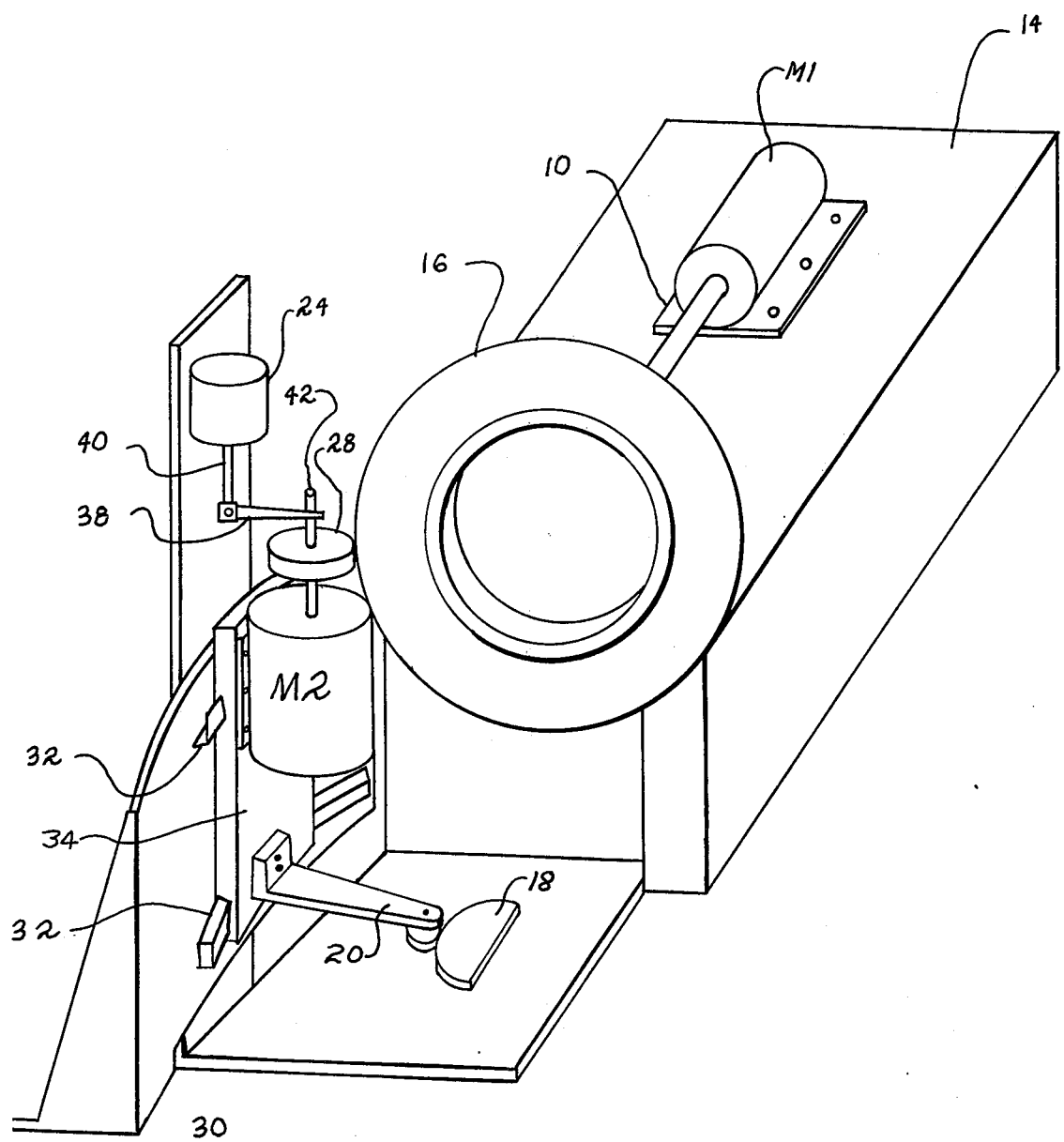
FIG. 1 is a view illustrating diagrammatically a machine for use in removing tread material from a radially belted vehicle tire.

Referring to the drawings somewhat more in detail, in FIG. 1, reference numeral 14 represents a general integral machine frame comprising support members for all individual elements requiring support. M1 is a drive motor which is securely fastened to machine frame 14. Drive motor M1 is a reversible drive motor having operator controls which, upon command, will stop rotating in one direction and begin rotating in a reverse direction.

Drive motor is engaged with drive shaft 10 which is supported also by machine frame 14 (not shown) and engages radial belted pneumatic vehicle tire 16. Tire 16 is securely fastened and adapted to be driven in either direction by drive shaft 10. On a line radially outward of tire 16 and slightly above or below the horizontal centerline of the tire 16, a rotatable cutter 28 engages said tire 16 in order to remove tread material for recapping purposes.

Figure 3:
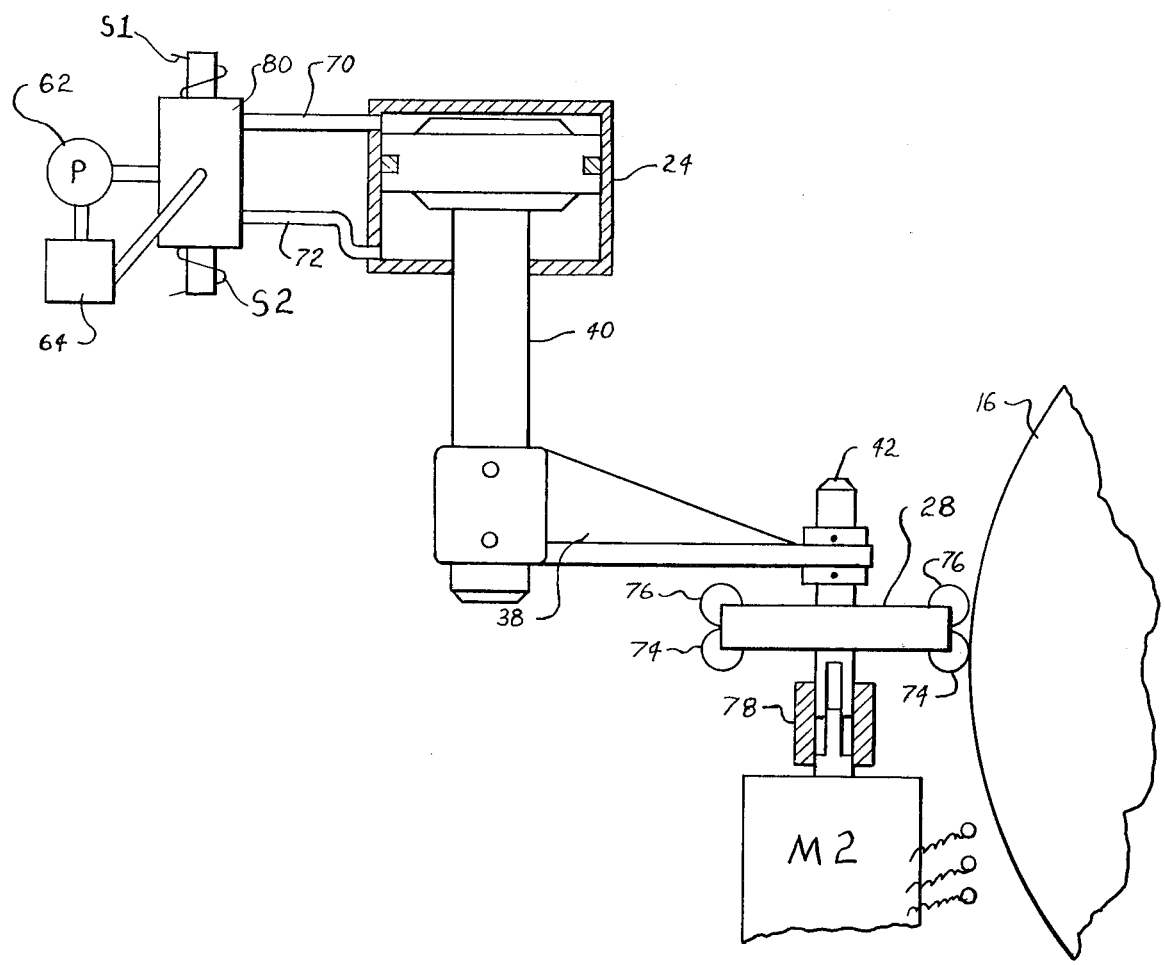
FIG. 3 is an illustration of a suitable means for shifting the cutter in a vertical position.

Cutter 28 is engaged by drive shaft 42, more details of which will be seen in FIG. 3 description. Drive shaft 42 also engages drive motor M2, on one end and a positioning finger 38 on the other end of drive shaft 42. Drive motor M2 is also a reversible motor whose direction of rotation cooperates with drive Motor M1 by reversing its direction of rotation in concert with that of motor M1 at the command of the machine operator.

Drive motor M2 is securely mounted to general support and positioning plate 34. General support and positioning plate 34 rides on curved rails 32 in such a manner as to cooperate with the contoured face of cam 18. Attached to and extending from general support plate 34 is a cam arm 20 which guides the rotation of general support and positioning plate about a vertical axis of rotation selectively chosen by the curved surface of cam plate 18. Cam plate 18 is interchangeable but securely fastened to a forwardly extending base member of general machine frame 14.

A means of vertically positioning cutter 28 is provided by engagement of finger 38 in a horizontally slotted portion of drive shaft 42. As will be seen by FIG. 9, the vertical position of cutter 28 can be an important part of the method and apparatus of the invention herein described. Finger 38 is engaged with piston operated member 40 whose vertical position is determined by fluid action inside cylinder 24. Details of this operation will be described in FIG. 3.

Figure 4:
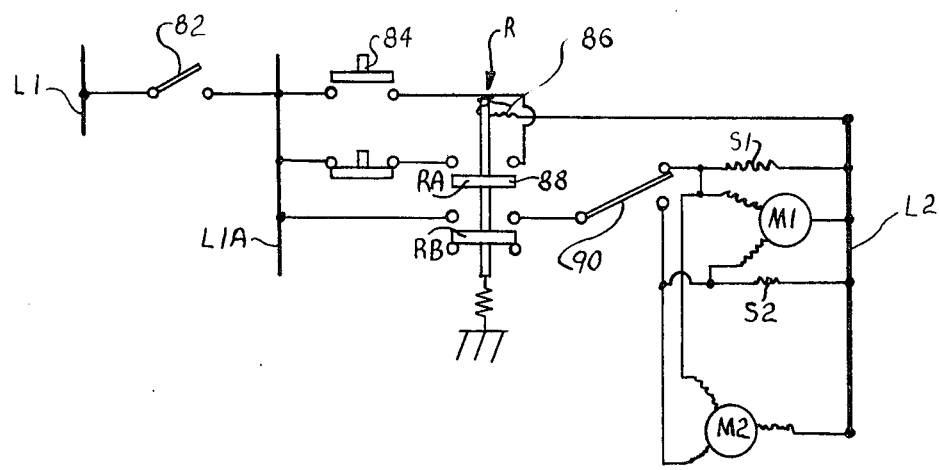
FIG. 4 is an electrical schematic of the apparatus described herein.

Drive motor M1 drive motor M2 and fluid vertical positioning cylinder 24 are dependent and cooperating elements as will be shown in FIG. 4 electrical schematic.

Operation of the general machine is as follows: drive motor M1 is started rotating drive shaft 10 and tire 16 in a counterclockwise direction. Simultaneously with actuation of drive motor M1, drive motor M2 and fluid operated cylinder 24 are actuated. Drive motor M2 drives cutter 28 in a counterclockwise rotation as viewed from a top view and fluid operated cylinder 24 positions cutter 28 vertically about the radial centerline of the tire for cutting treads. General support and positioning plate 34 is then moved radially inward on an axial centerline of tire 16 until cam arm 20 abuts the cam face of cam plate 18 while cutter 28 has simultaneously engaged rotating tire 16 and has begun the cutting operation. The cutter is rotated at about 3600 RPM while the tire is rotated at about 120 RPM, taking a chip thickness of 0.030 to 0.040 per cut.

The general support and positioning plate 34 then rotates about a vertical axis defined by cam plate 18 guiding cutter 28 on a desired contour transversely from an axial centerline of tire 16 to an axially outer side wall of said tire 16. At the completion of the cutters 28 transverse path across tire 16, a command initiated by the operator moves cutter 28 radially outward from tire 16 periphery and relocates cutter 28 on an axial centerline of tire 16. At the same command from the operator, drive motors M1, 36, and M2, 30, were reversed in rotation and fluid operated cylinder 24 moved cutter 28 to a new vertical position about the tires radial centerline.

From this position, again cam arm 20 is moved radially inward until it abuts cam plate 18 while simultaneously cutter 28 engages the outer periphery of tire 16. From this position then the general support and positioning plate follows the cam face contour of cam plate 18 moving to the opposite side that it had just transversed previously thereby guiding cutter 28 from the axial centerline of tire 16 to the axially opposite side wall that the cutter had transversed to previously. This then contemplates the cut and tire 16 may be dismounted from the machine and another tire 16 mounted thereon for cutting.

Figure 2:
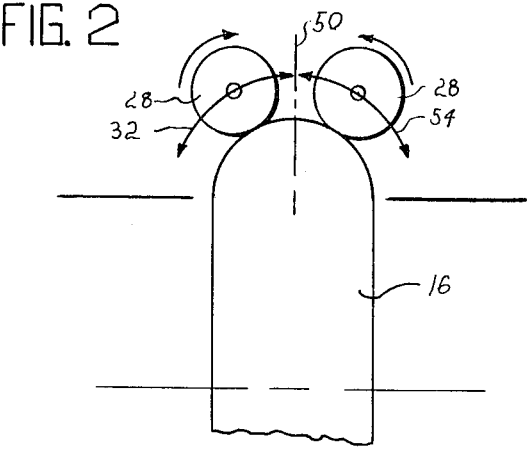
FIG. 2 is a top schematic view of the cutter engagement with the tire illustrating the transverse path of the cutter from the tire crown to each side wall.

Referring to FIG. 2 in which a top view of the engagement of cutter 28 and tire 16 is shown, the axial centerline of tire 16 is depicted by 50 which the cutter is positioned near upon first engagement with tire 16. Arrows 52 and 54 show the paths that the axial centerline travels as cutter 28 moves from the tire crown on tire 16 to each outer side wall thereof. Arrows are also provided to show the necessary rotation of the cutter 28 depending on which side the cutter 28 traverses too.

This rotating is necessary such that the radial belted material is never undercut during the operation. The rotation of tire 16 is also reversible with cutter 28 and its direction depends on the vertical locating of cutter 28 with respect to the horizontal centerline of tire 16. The direction of rotation of tire 16 is important in relation to the vertical position of cutter 28 in order to provide clearance for the cutting inserts that are not engaged with the tire during the cutting operation. More details of this will be seen in FIG. 9.

FIG. 3 is generally a means of providing the desired vertical positioning of cutter 28 when engaging tire 16. Drive motor M2 is engaged with drive shaft 42 by a splined collar 78 which captively engages drive shaft 42 while allowing clearance for drive shaft 42 to move vertically upon command. The top of drive shaft 42 has a horizontal slot provided for engagement with finger 38. Finger 38 is connected with piston element 40 in a rigid construction such that when piston element 40 moves vertically up and down, so does finger 38 and drive shaft 42.

The vertical position of piston element 40 is controlled by the flow of fluid into fluid cylinder 24 either being above or below the upper end of piston element 40. The upper end of piston element 40 is formed with a radially outward seal member such that it vertically separates fluid cylinder 24 into two individual sealed compartments.

Fluid paths 70 and 72 are the inlet, outlet means for fluid supplied to fluid cylinder 24. Fluid pump 62 supplies fluid to solenoid operated valve 80 which, in turn, directs fluid down either supply line 70 or 72 while returning fluid to the reservoir 64 through the opposite line which the fluid is being supplied.

Solenoid switches S1, 66, and S2, 68, are cooperatively dependent on the actions of drive motors M1 and M2 as is shown in the electrical schematic of FIG. 4.

A schematic electrical control circuit is illustrated in FIG. 4. In FIG. 4, L1 and L2 represent the power lines and L1A indicates a line which is energized from line L1 by closing of on-off switch 82.

A relay R is connected between lines L1A and L2 and is energized upon closing of start switch 84. When the relay closes, it closes its blades RA RB of which RA is a holding blade that establishes a holding circuit for the relay via normally closed stop switch 86.

When blade RB closes, power line L1A is connected to the movable blade of a switch 90 which, when closed on contact 90A, energizes solenoid S1 of the valve pertaining to the cutter shifting mechanism and also energizes motors M1 and M2 to run in one direction. When blade 90 is closed upon contact 90B, the other solenoid S2 of the valve for controlling the shifting of the cutter is energized and motors M1 and M2 are energized to rotate in the opposite direction. Motors M1 and M2 are advantageously of the electrically reversible type.

Figure 5:
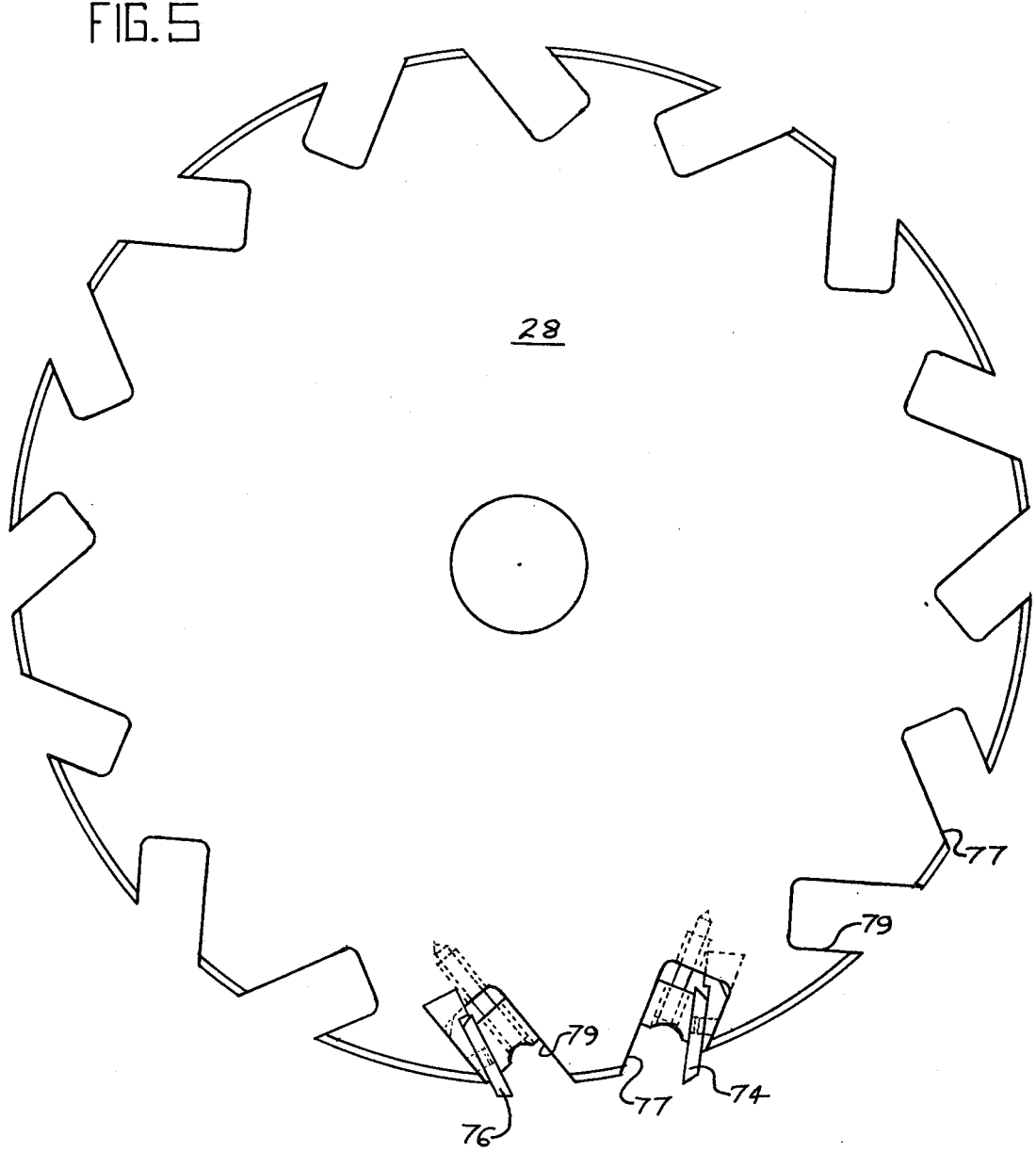
FIG. 5 is a schematic plan view showing the cutting device with inserts.

Referring to FIG. 5, the rotatable and reversible cutter of the invention is shown in a plan view. The cutter body 28 has a plurality of slots 77 and 79 formed therein extending inwardly from the periphery of the cutter body in uniformly distributed circumferential relationship and each slot alternately inclined in a predetermined direction relative to a radius of the body.

The alternately inclined slots 77 and 79 receive cutting inserts 74 and 76 and nesting arrangement shown in detail in FIG. 7. The inclining and opposing slots 77 and 79 make possible the unique feature of cutter 28 being able to cut rubber chips from tire 16 by rotating in either direction.

Referring to FIG. 6, a side view of cutter 28 is shown depicting the opposing and axially alternating position of cutting inserts 74 and 76. Rotating in a certain direction, cutters 74 are the only cutters to engage tire 12 and cut chips therefrom. Upon command of the operator, the machine will disengage cutters 74, reverse the direction of cutter body 28 and shift cutter body 28 to engage cutters 76 with tire 12 to cut chips therefrom.

Referring to FIG. 7, a clamping or nesting arrangement is shown in detail for cutter body 28 and an insert 96. As will be seen in FIG. 7, the one side 91a of nest element 91 engages one side of slot 90 and the bottom wall of recess 100 which is formed in the opposite side of the nest member, diverges in the radially outward direction with the opposite side of the nest member. The top face of an insert 96 in the recess also diverges from the opposed side wall of the slot in the outward direction.

Because of this, the cutting insert and nest member can be firmly clamped in position by utilizing a simple wedge 92, the opposite sides of which taper so that when one side of the wedge engages the adjacent side of a slot 90, the opposite side of the wedge engages the exposed top surface of the adjacent cutting insert 96.

The wedge 92 is adapted for being firmly drawn into slot 90 to effect the aforementioned wedging action by a screw 94 which has the opposite ends threaded in respectively opposite directions with the radially outer threaded end threadedly engaging a hole in the wedge and the other threaded end threadedly engaging a threaded hole in the cutter body which extends in a direction parallel to the wall of the slot 90 and on which the wedge slides.

Each cutting element, or insert, 96 is formed of a hard wear resistant material such as a good grade of tool steel or, preferably, a cemented hard metal carbide material such as tungsten or titanium carbide or mixtures thereof. Other hard metal carbides can be included in the composition without in any way detracting from the utility of the inserts.

Each cutting element, or insert, 96 is circular, has parallel top and bottom faces and a peripheral wall. Each cutting element, or insert, can be indexed about its axis so that when one peripheral portion of the element or insert becomes worn, a new portion can be brought into cutting position. It will also be noted that the cutting element, or insert, has a relatively sharp edge 102 extending thereabout at the juncture of the peripheral wall with the top face with the included angle formed between the peripheral wall and the top face ranging from about 85° down to about 30°.

The included angle formed at the cutting edge is determined by the angle which the cutting element makes with the peripheral surface of the cutter body adjacent thereto because the radially outer side of the periphery of the cutting element must be inclined at such an angle as to provide for clearance from the tread material being cut.

As illustrated in FIG. 8, each cutting element has an angle of about 45° at the cutting edge and is inclined at an angle of about 30° to the radius so that the clearance angle at the radially outer side of the element is on the order of about 15°.

Referring to FIG. 9, we can see the effect the vertical placement of cutter body 28 can have on the chip cutting on tire 16. The profile of the periphery of tire 16 is shown in cooperating rotation with cutter 28. As tire body 16 rotates in the direction 104, the cutter body 28 is rotating in direction 106 and cutter 114 engages tire body 16 cutting chips therefrom. The chips taken from tire body 16 by this action provide a working clearance for cutter 112 which is facing the opposite direction of cutter 114.

When the chip cutting is finished by the machine, a command from the operator will produce the following change in conditions: first, cutter body 28 will shift its vertical position such that cutter 112 will engage tire body 16 at the same location as cutter 114 engaged tire body 16. At the same time, tire body 16 rotation is reversed to the direction of arrow 110 and cutter body 28 has its rotation changed to that of arrow 108.

All of the above conditions are changed during a disengagement of tire body 16 and cutter body 28. Once the conditions are changed as described above, then the cutter 112 is moved radially inward to tire 16 and a working engagement is thereby effected. At this point, the chips taken from tire 16 now provide a working clearance for the opposing insert 114.

It is to be understood from the description of the machine that it is to be used primarily on radial belted tires, but it can, also, be utilized on all types of tires, not necessarily only radial belted tires.

The speeds and feeds given herein are only for one specific situation, it being understood that these can be varied, and they are, therefore, included by way of example instead of limitation.

Modifications may be made within the scope of the appended claims.

We claim:

1. A tool for cutting tread material from a pneumatic tire preparatory to retreading of the tire, said tool comprising; a disc-like body, reversibly rotatable about its central axis and having a plurality of slots extending inwardly from the periphery thereof and uniformly distributed circumferentially about said body, alternate ones of said slots forming a first and a second set of slots, the slots of said sets being inclined in respectively opposite directions relative to a radius of said body passing therethrough, each slot adapted for receiving a hardened insert therein, hardened inserts disposed in said slots, means for aligning the inserts in said first set of slots in a first plane perpendicular to the axis of said body and the inserts in said second set of slots in a second plane parallel to and axially spaced from said first plane, and clamping means for fixedly securing the inserts in said slots.

2. A tool according to claim 1 wherein the slots extend axially completely through the disc-like body.

3. A tool according to claim 1 wherein said slots are inclined at an angle of about 25 degrees relative to said radius.

4. A tool according to claim 1 wherein said inserts have a positive rake angle when engaged with the workpiece.

5. A tool according to claim 1 wherein the inserts are formed in the shape of a circular disc.

6. A tool according to claim 1 wherein the inserts are formed from a cemented hard metal carbide material.

7. A tool according to claim 1 wherein the inserts are interchangeable and each is indexable about the central axis thereof.

* * * * *